United States Patent [19]

Dille

[11] Patent Number: 4,575,061

[45] Date of Patent: Mar. 11, 1986

[54] ADJUSTABLE ALIGNMENT TOOL

[76] Inventor: Monte A. Dille, 2320 Greenbrier La., La Habra, Calif. 90631

[21] Appl. No.: 660,714

[22] Filed: Oct. 15, 1984

[51] Int. Cl.$^4$ .............................................. B25B 1/20
[52] U.S. Cl. ...................................... 269/44; 269/45; 269/228; 269/287
[58] Field of Search ................. 269/41, 43, 44, 45, 269/287, 228, 152; 29/271

[56] References Cited

U.S. PATENT DOCUMENTS

| | | | |
|---|---|---|---|
| 1,875,761 | 9/1932 | Power | 269/45 |
| 2,127,828 | 8/1938 | Milton | 269/287 |
| 2,433,172 | 12/1947 | Tipton | 269/287 |
| 3,086,767 | 4/1963 | Boser | 269/45 |
| 3,966,528 | 6/1976 | Chrstie | 269/41 |

*Primary Examiner*—Robert C. Watson
*Attorney, Agent, or Firm*—Bruce L. Birchard

[57] ABSTRACT

A tool for the alignment of plastic pipes to be joined by fusion, particularly pipes which have a memory of being curved, comprises a base carrying a fixed clamp at or near one end thereof, such clamp being circular and having a center point, the base having a longitudinal slot therein aligned with the center point, such slot being provided to receive a pair of movable clamps of the same general design as the fixed clamp but which are positionable along the slot with their center points co-linear with the center point of the fixed clamp, the movable and fixed clamps having a gripping diameter such that they snugly engage the pipes to be fused when such pipes are in the clamps and the clamps are in their closed positions; but the movable clamps being longitudinally adjustable, as indicated, to produce alignment and contiguity of the ends of two plastic pipes to be joined by fusion.

2 Claims, 3 Drawing Figures

ADJUSTABLE ALIGNMENT TOOL

BACKGROUND OF THE INVENTION

1. Field of the Invention

This invention relates to fabrication tools and, particularly, to field-use tools for joining pipe members.

In installing or repairing distribution and delivery systems for fluids, such as heating gas, it is now common practice to utilize polyethylene pipe which is supplied on large rolls. When the pipe is removed from the roll it has a history of being curved so it tends to retain its curved configuration. When it is necessary to join the ends of successive lengths of pipe it is common to use thermo-fusion or, more recently, electro-fusion, a method in which a fitting carrying an electrical heating element is slipped over the joint between the pipe sections to be joined, electrical current is passed through the heating element and the temperature of the junction between the electro-fusion fitting and the pipes to be joined is raised to the temperature where the polyethylene flows and a union occurs between the pipe sections and between the pipe sections and the fitting.

With either thermo-fusion or electro-fusion it is imperative, for a strong joint to be formed, that the ends of the pipe sections being joined, be accurately aligned, i.e. so that the pipe sections are precisely concentric.

Tools and fixtures previously available were not able to achieve that end accurately enough, particularly in the field, where the real need existed. As a result, plastic pipe joints were not reliable and the time consumed in trying to make them reliable was excessive.

Therefore, it is an object of this invention to overcome the various problems of the prior art, as set forth herein-before.

It is a further object of the present invention to provide an alignment tool which is effective, in the field, for producing accurate alignment of plastic pipes, prior to the joining thereof.

SUMMARY OF THE INVENTION

A base member, having a length of about a meter, carries at one end thereof, a fixed clamp member, sized to engage, snugly, a pipe to be joined with another pipe. Two corresponding clamps are carried, slidably, in a longitudinal slot in the base member with the three clamps having their centers lying along a common axis and the longitudinal slot being parallel to such axis. The fixed clamp is applied to the end portion of the first one of the pipes to be joined. That fixed clamp has a sufficient longitudinal extent to achieve a straightening effect on that end portion of that pipe to be joined. The other pipe is then engaged by the remaining two clamps and their relative positions are adjusted until the local end of that other pipe is aligned with the end of the first pipe and is in physical contact therewith, with, for example, an electro-fusion fitting covering the joint between the pipes. Current is applied to the electro-fusion fitting (for example) for a pre-determined time known to produce plastic flow and the current is then interrupted. After another pre-determined time known to be required for the cooling, to ambient temperature, of the plastic pipe ends and the fitting, the three clamps are then released and the tool removed. The resulting joint has been found to be strong and reliable.

BRIEF DESCRIPTION OF THE DRAWINGS

Features of the present invention which are believed to be novel are set forth with particularity in the appended claims. The present invention both as to its organization and manner of operation, together with further objects and advantages thereof, may be best understood by a reference to the following description taken in connection with the accompanying drawings, in which:

DETAILED DESCRIPTION OF THE PREFERRED EMBODIMENT

Figure 1:
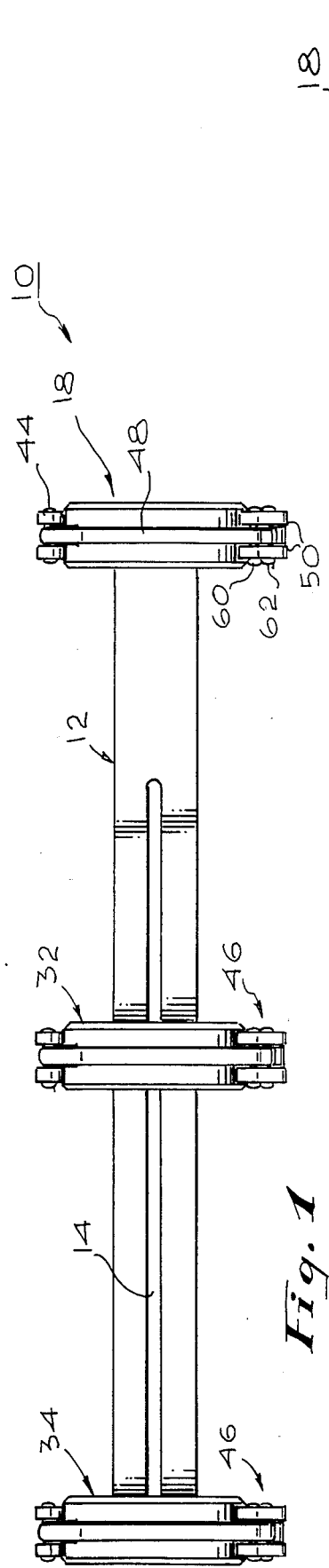
FIG. 1 is a plan view of the alignment tool according to my invention.
Figure 3:
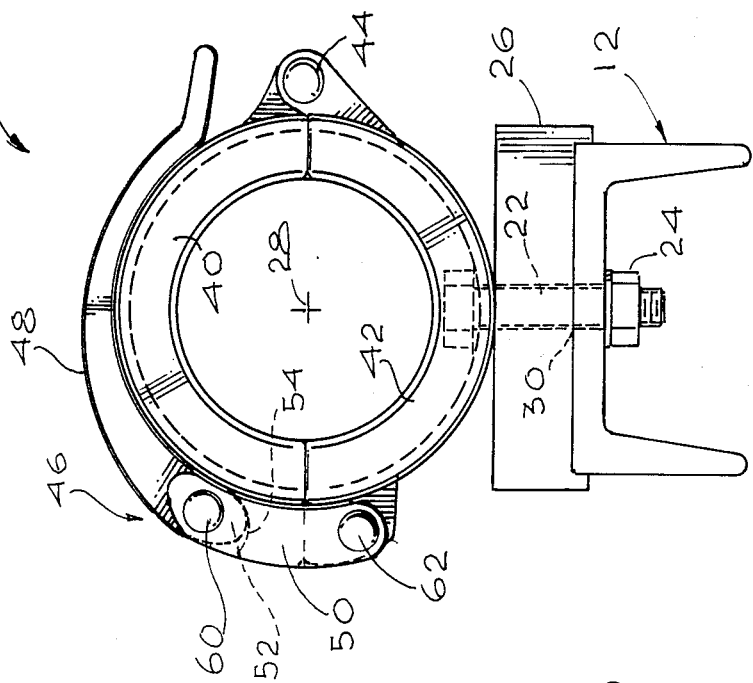
FIG. 3 is an end view of the alignment tool of FIG. 2.
Figure 2:
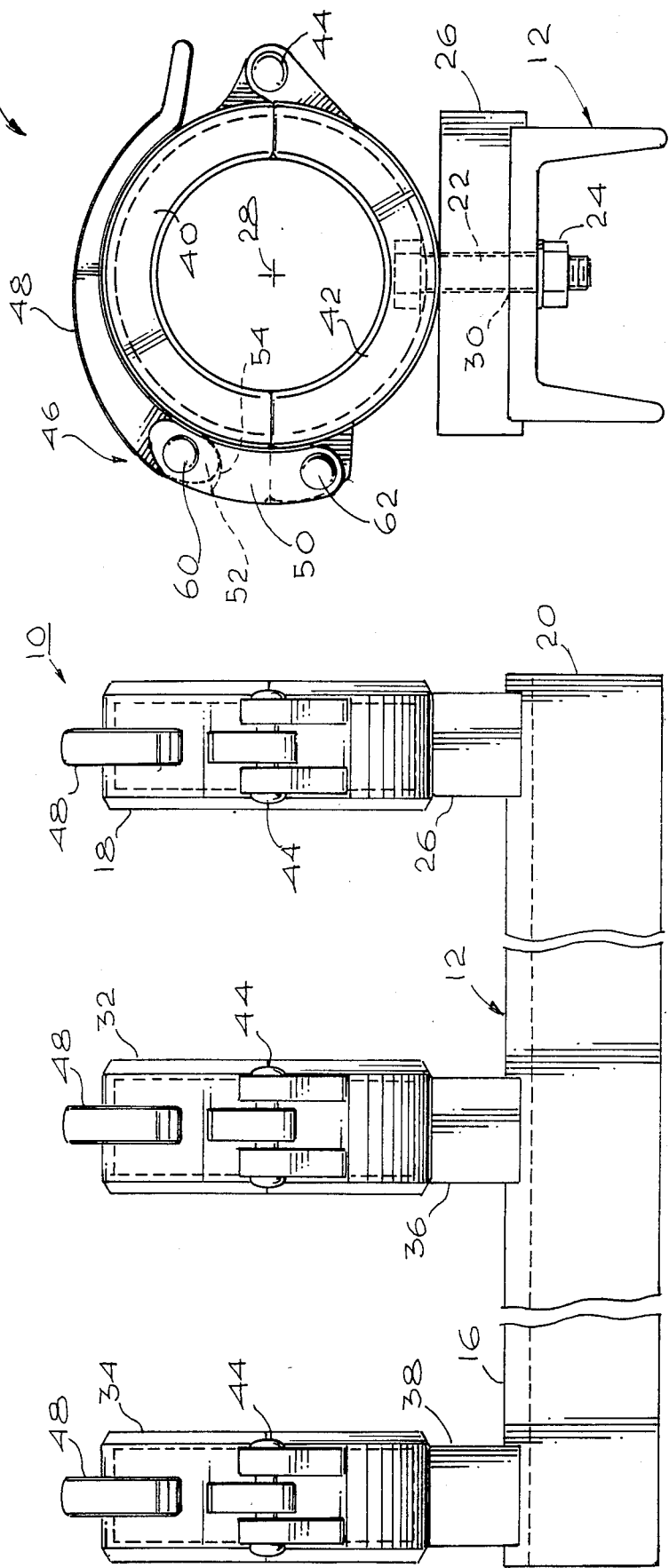
FIG. 2 is a rear-elevational view of the alignment tool of FIG. 1.

In FIGS. 1, 2 and 3, alignment tool 10 includes base 12, which may be of channel shape, as can be seen in FIG. 3. Base 12 may be made of aluminum. A slot 14 is provided in the upper portion 16 of base 12. The length of base 12 is, for the installation of 2 inch to 4 inch plastic pipe in gas-main applications, about three feet (one meter). Slot 14 may be of a length equal to about two-thirds of the length of base 12.

A fixed clamp 18 is fixedly supported at a first end 20 (FIG. 2) of base 12. The securing means for fixed clamp 18 may be a bolt 22 in combination with a nut 24 (FIG. 3). Fixed clamp 18 has a shallow-channel-shaped clamp-base portion 26 which forms, on its lower face, a sliding fit over base 12. This clamp-base 26 orients fixed clamp 18 so that it is at right angles to base 12 and its center 28 is over the center of base 12. Bolt 22 (FIG. 3) passes through a hole 30 in base 12 to fix the location and orientation of fixed clamp 18.

Movable clamps 32 and 34 are of the same construction as fixed clamp 18, each with the depending bolt 22 and cooperating nut 24. In the case of movable clamps 32 and 34, however, the depending bolt 22 passes thru slot 14 so that either or both of clamps 32 and 34 may be moved in slot 14 until the plastic pipe inserted in them is straight and aligned with and contiguous with the plastic pipe held in clamp 18.

Slot 14 is aligned with hole 30 and is centrally disposed in upper surface 16 of base 12. Thus, movable clamp bases 36 and 38 (which are of the same size and shape as fixed clamp-base 26); when in position on base 12, orient movable clamps 32 and 34 so that they are parallel to fixed clamp 18 and their centers are aligned with center 28 of fixed clamp 18.

Clamps 32 and 34 are of the same construction as clamp 18, so only clamp 18, as seen in FIG. 3, will be discussed. In FIG. 3, clamp 18 comprises clamp-base 26, securing means comprising 22 and nut 24 (already discussed) a pair of semicircular, opposed clamp sections 40 and 42, pivotally joined by pin 44 and closure means 46, comprising handle portion 48 and articulating member 50 pivotably connected to handle portion 48 by pin 60 and to semi-circular clamp-section 42 by pin 62. Handle 48 terminates in a nose portion 52 which engages, snugly, recess 54 in semi-circular clamp section 40, and toggles into the closed position of clamp 18, causing such closed position to be maintained. Toggling occurs when the tip of nose portion 52 passes over the lowermost portion of recess 54, in either the closing or opening direction of motion of handle 48. Articulating member 50 is stressed by the engagement of the tip of the nose portion 52 with recess 54 and forces the two semi-circular clamp sections 40 and 42 into firm engagement. The back pressure from the semi-circular members 40 and 42 with their pin member 44 and its associated hinge, the latter combination having a certain amount of resilence, keeps nose portion 52 in firm engagement with recess 54. As can be seen in FIG. 3, with clamp 18 in the closed position, the lowermost point on nose portion 52 is below the level of the outermost extremity of recess 54 thus preventing the slipping of nose portion 52 out of recess 54 and retaining clamps in a closed condition.

In use, a first plastic pipe to be joined is clamped in position by fixed clamp 18. The second pipe is engaged by clamps 32 and 34, which are adjusted in position until the second pipe is straight as between clamps 32 and 34 and the end of the second pipe is aligned with the opposing end of the first pipe. Any bonding fitting, such as an electro-fusion fitting, is applied to the second pipe and the second pipe is slid into conjunction with the opposing end of the first (fixed pipe) the fusion-fitting is moved to straddle the joint and appropriate heating of both pipes and the fitting occurs to cause a joining of all the elements in a reliable and leakproof joint.

While a particular embodiment of my invention has been shown and described, it will be apparent to those skilled in the art that variations and modifications may be made therein without departing from the spirit and scope of my invention. It is the purpose of the appended claims to cover all such variations and modifications.

I claim:

1. An alignment tool including:
   a base portion having a slot extending for a substantial portion of the length of said base portion;
   a fixed clamp positioned proximate to one end of said base portion, said clamp having a first center point, said first center point being aligned with said slot in said base portion;
   a first movable clamp supported in said slot and having a second center point;
   a second movable clamp supported in said slot and having a third center point;
   said first, second and third center points being aligned;
   said first and second movable clamps being adjustable in position along said slot with respect to each other and with respect to said fixed clamp while maintaining said first, second and third center points in alignment;
   said first and second movable clamps including means for fixing the positions of said movable claimps in said slot;
   each of said fixed and first and second movable clamps including a pair of semi-circular, opposed clamp sections pivotally joined to each other;
   said base portion being channel-shaped with the sides of the channel directed away from said fixed and first and second movable clamps;
   said fixed and first and second movable clamps each including, in addition, closure means comprising a handle portion and an articulating memer pivotably joined to said handle portion, said articulating member being, in turn, pivotably joined to one of said semi-circular clamp sections, said handle portion including a nose portion for engaging the other of said semi-circular clamp sections in said pair in toggling fashion, each of said fixed and first and second movable clamps including, in addition, a clamp base portion having a shallow-channel shape, with said shallow-channel facing away from said semi-circular clamp secitions, said channel in said clamp base portion having an internal width corresponding to the outer width of said base portion of said alignment tool.

2. Apparatus according to claim 1 in which said fixed clamp is adapted to receive the end of a first plastic pipe and said first and second movable clamps are adapted to receive the end section of a second plastic pipe to be joined with said first plastic pipe.

* * * * *